Nov. 25, 1947.  I. J. HASKEL  2,431,555
AUTOMATIC SHOT FEEDING APPARATUS FOR GANG SAWS
Filed Nov. 10, 1945  4 Sheets-Sheet 4

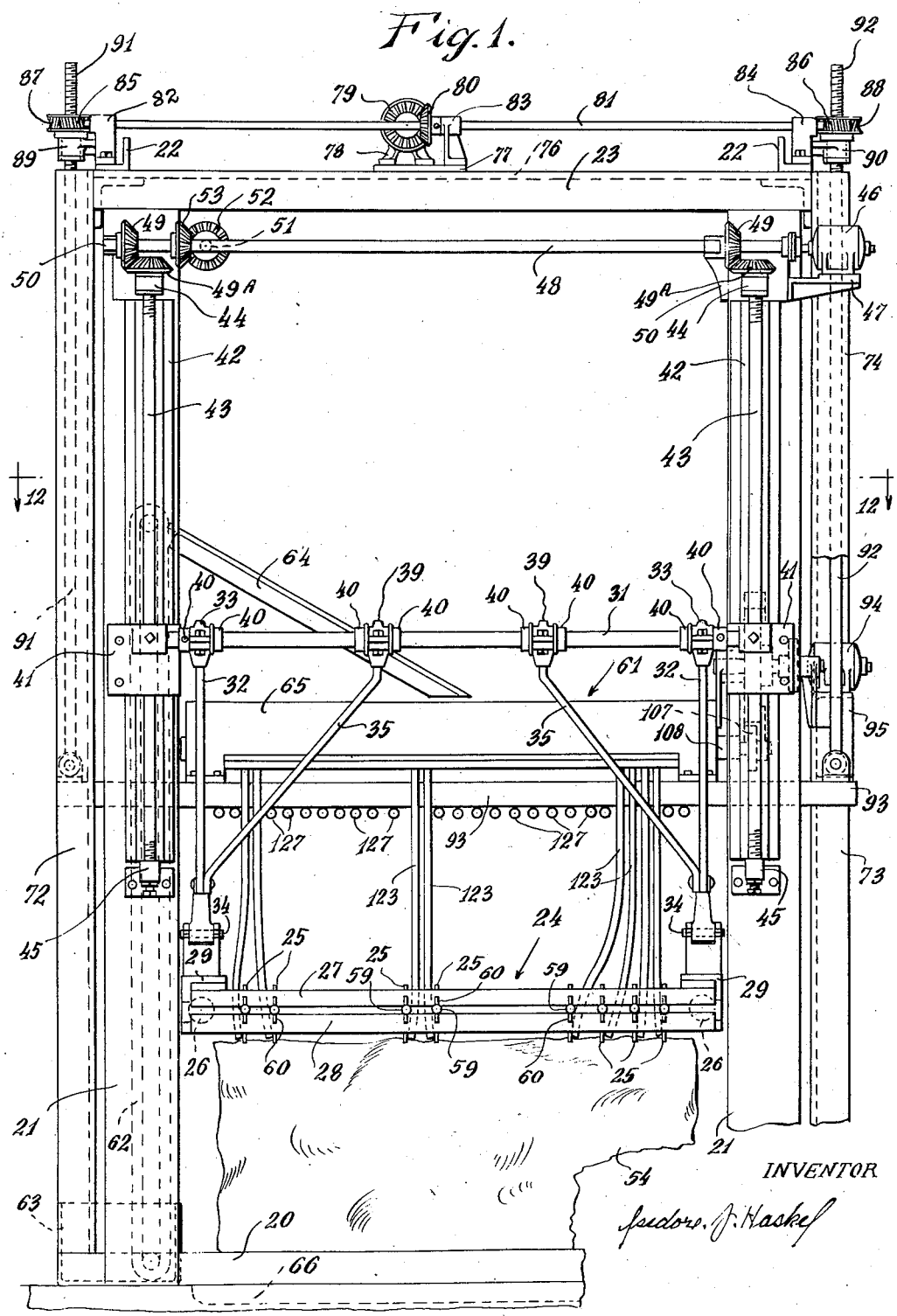

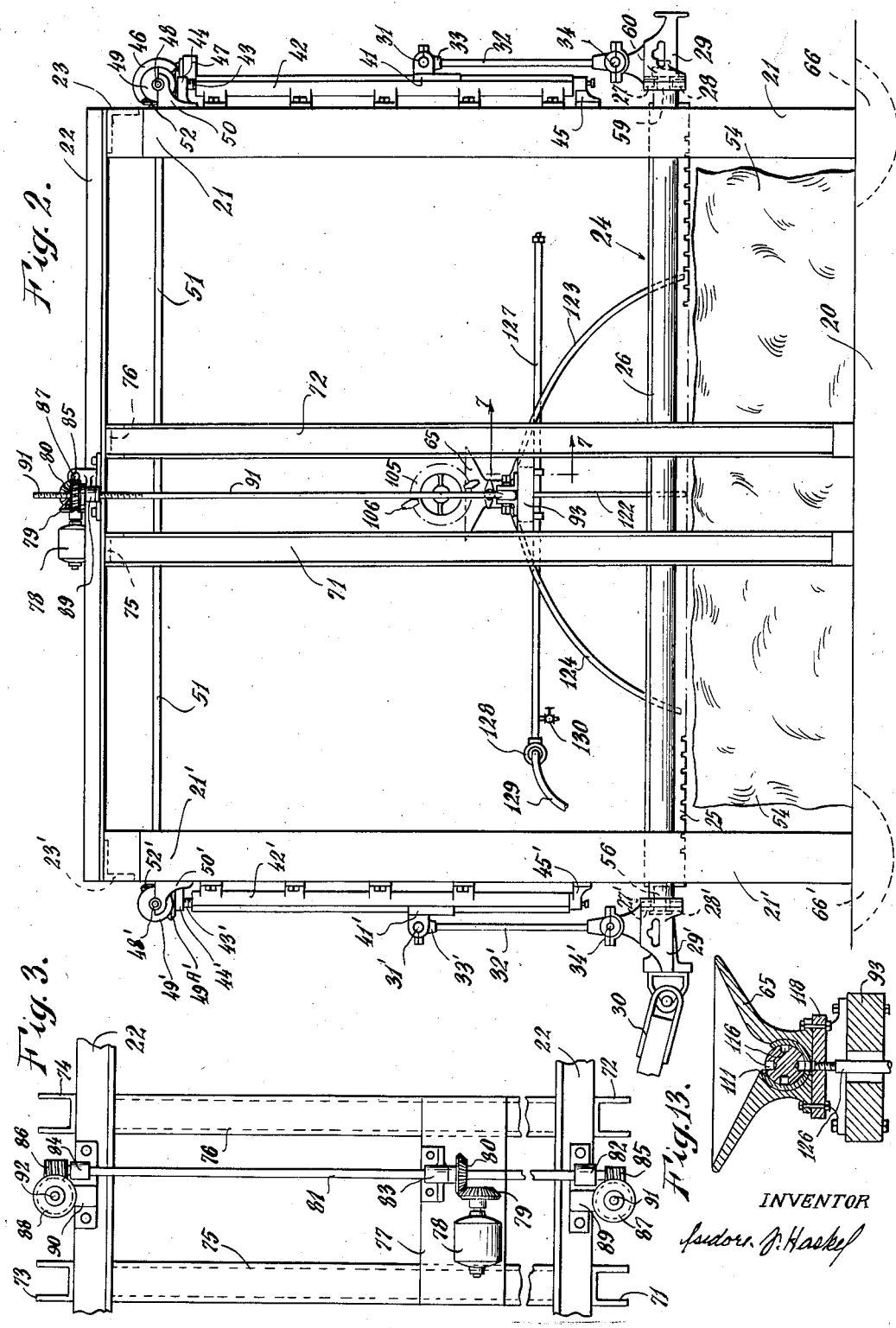

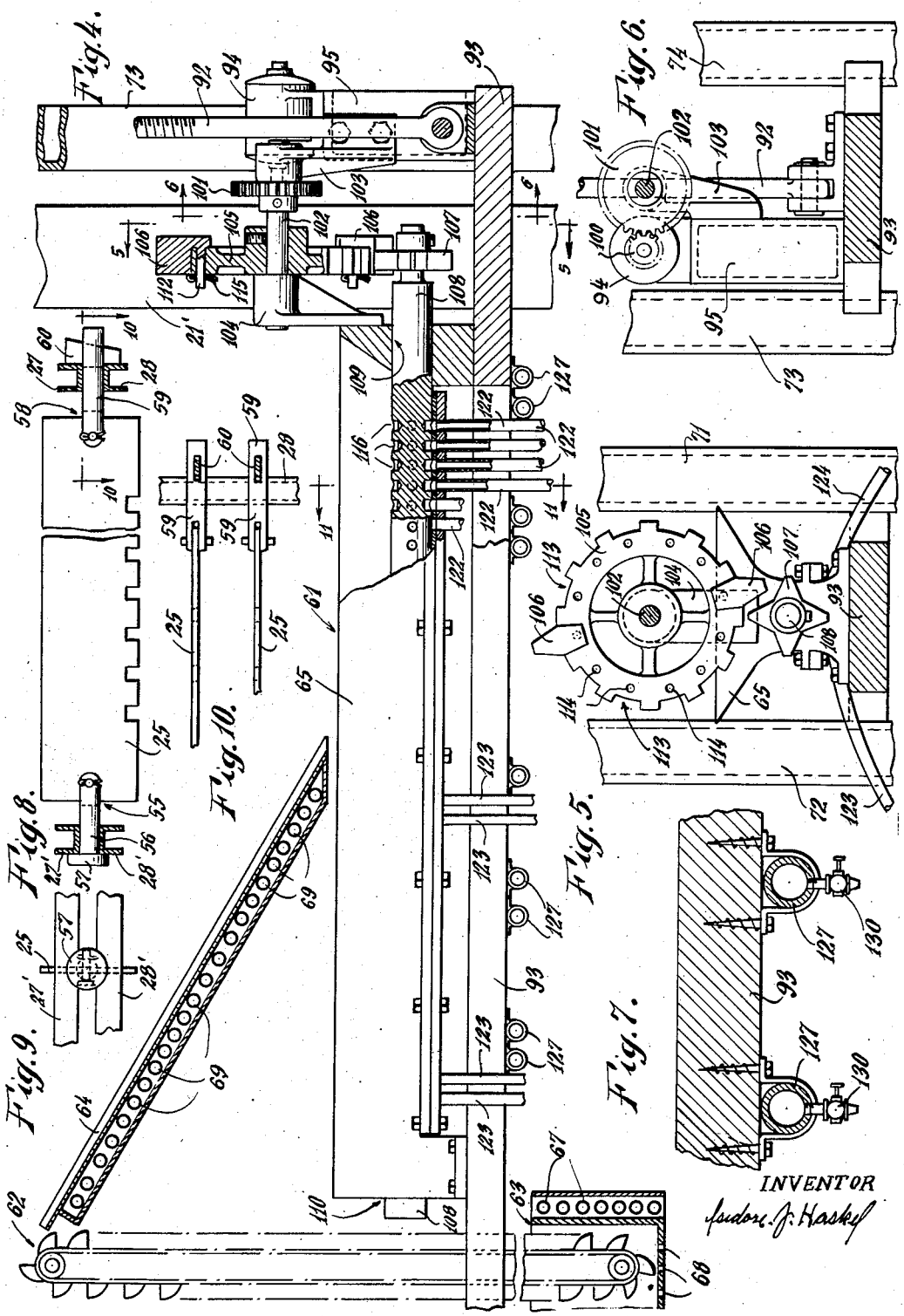

INVENTOR
Isidore J. Haskel

Patented Nov. 25, 1947

2,431,555

UNITED STATES PATENT OFFICE 2,431,555

AUTOMATIC SHOT FEEDING APPARATUS FOR GANG SAWS

Isidore J. Haskel, Brooklyn, N. Y.

Application November 10, 1945, Serial No. 627,866

11 Claims. (Cl. 125—16)

1

This invention relates to a stone-working machine, and more especially to automatic shot-feeding apparatus for gang saws and circular saws employed for sawing stone blocks into plates or slabs.

Gang saws for parting stone blocks usually employ a plurality of saw or cutting blades, which are suitably spaced apart to obtain the desired thicknesses of the slabs. The saw blades may be mounted in a saw frame or sash, which is either of the swinging type or which may have a straight reciprocating movement. Small steel shot, crushed steel, "carborundum," or other abrasive material, and water are fed to the blades, and, by adherence to the cutting edges of the blades, this abrasive material forms the actual cutting agent. In the description to follow, the term "shot" will be used, and it will be understood that this term includes all the different abrasive materials usually employed in the cutting of stones and the like.

Heretofore, the shot and water needed for the cutting operation were spilled from an opening of a large barrel, mounted on top of the saw structure, onto a distributing trough or spreader, provided with slots, from which the shot and water were splashed on top of the stone to be cut. Some of the shot would then roll into the grooves cut by the saw blades and adhere to the latter. Consequently, the shot and water were distributed over the whole upper surface of the stone more or less haphazardly, and the amount of shot which finally found its way to the individual blades was under no positive control.

Shot and water will spill out in front and rear of the saw blades during the cutting operation. Therefore, it has been customary heretofore to provide a large slanted pit underneath the machine for collecting the shot and water. In connection with the collecting pit, settling pits were also provided, to collect the mud which is necessarily a by-product of the cutting operation. The shot and water from the collecting pit were then pumped by a suitable sump pump, mounted in this pit, into the aforementioned barrel on top of the gang saw, from where shot and water were spilled again onto the spreader and the stone to be cut.

The efficiency of the sawing or cutting operation depends to a great extent upon the amount of shot fed to the saw blades and on its even distribution therealong. If too little shot is available at the blades, they will be burned and burred by friction; if too much shot is fed, however, the blades may jam, and in both cases the cutting efficiency is materially decreased.

2

In order to pump the comparatively heavy shot from the collection pit to the distribution barrel on top of the saw structure, an amount of water far in excess of the requirements for cutting had to be constantly circulated heretofore.

One object of the present invention is to provide means for feeding a predetermined amount of shot to each of the cutting blades.

Another object is to provide feeding means adapted to supply a predetermined amount of shot to the cutting blades at predetermined points therealong.

Still another object is to provide means for feeding the shot to the cutting blades separately from the water, thereby obtaining positive and independent control over both, the quantity of water applied as well as the amount of shot fed.

A further object of the invention is to provide separate feeding means for shot and water, which lend themselves to convenient and independent adjustment for supplying the correct amounts of shot and water, respectively, when sawing different materials, such as sandstone, limestone, marble, granite, and the like, to obtain maximum operating efficiency when sawing each of these different materials.

These and other objects, which will be pointed out in the specification and especially in the claims to follow, I attain by means of my invention disclosed in the drawing, wherein:

Fig. 1 illustrates an end view of a swing-type gang saw incorporating the novel hopper feed for feeding the shot to the blades.

Fig. 2 shows a front view of the gang saw shown in Fig. 1.

Fig. 3 shows a plan view of part of the machine shown in Fig. 2, depicting in greater detail the lifting mechanism for the hopper feed.

Fig. 4 shows an enlarged side view of the hopper feed, partly in section.

Fig. 5 depicts a section taken on line 5—5 of Fig. 4.

Fig. 6 shows a section taken on line 6—6 of Fig. 4.

Fig. 7 is a section taken on line 7—7 of Fig. 2 and shows in greater detail the water pipes underneath the hopper for separately feeding the water.

Fig. 8 shows one saw blade in greater detail and the method of fastening the same in the saw frame or sash.

Fig. 9 is a left-hand end view of Fig. 8.

Fig. 10 is a plan view of the right-hand part of the saw frame along lines 10—10 of Fig. 8.

Fig. 13 is a section through the hopper feed and shows a modification of the design illustrated in Fig. 11.

*Swing-type gang saw*

Figure 11:
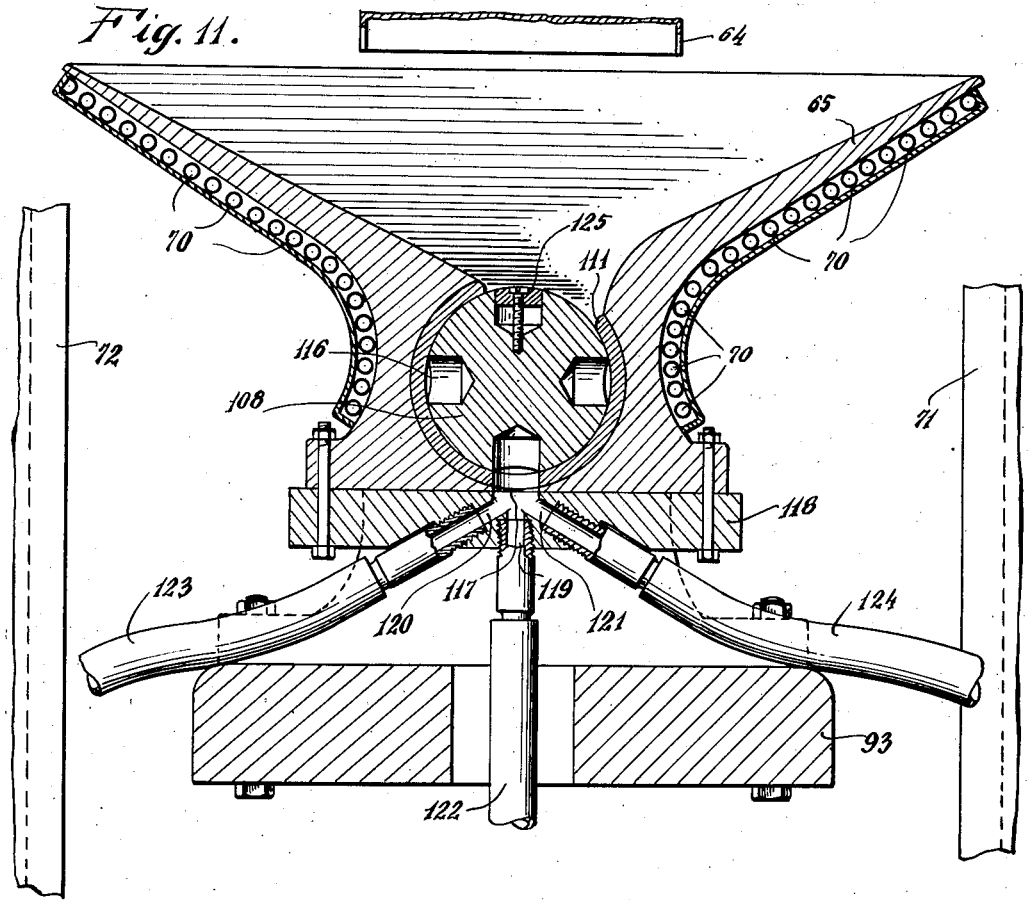
Fig. 11 is a section taken on line 11—11 of Fig. 4.

As shown in Figs. 1 and 2, a swing-type gang saw of conventional design has been chosen to illustrate the new and improved shot-feeding mechanism. Both sides of the gang saw, as shown in Fig. 2, are substantially symmetrical with respect to the vertical center line. Consequently, similar structural members on the left-hand side are designated by the same numerals as their corresponding members on the right-hand side but with a prime mark attached to them.

The gang saw consists primarily of a rectangular base 20, which carries a substantial main framework comprising two uprights 21 21 at its right end and two similar uprights 21' 21' at its left end. These uprights are connected in longitudinal and transverse directions by beams 22 22 and 23 23', respectively, to form a rigid structure for carrying a saw frame or sash 24, in which a plurality of saw blades or cutting blades 25 are suitably mounted.

The longitudinal pipes 26 26, the vertically spaced-apart channel sections 27 and 28 at the right end, and the corresponding channel sections 27' and 28' at the left end of sash 24 form the four sides of the latter. Members 29 29 are provided at the two right-hand corners of sash 24 to connect the ends of pipes 26 26 to the channel sections 27 and 28. Two similar connecting members 29' 29' are provided on the two left-hand corners of sash 24 for the same purpose.

The reciprocating movement may be imparted to sash 24 in any convenient manner, such as, for instance, by means of pitman 30, which is shown pin-connected to the left end of sash 24 in Fig. 2, and which may be actuated by a power-driven crank arm (not shown).

Sash 24 is suspended at its right end on transverse shaft 31 by means of links 32 32, pivotally connected at their upper ends to shaft 31 by means of suspension boxes 33 33 and pivotally attached at their lower ends to the corner members 29 29 by pins 34 34. Sash 24 is similarly suspended at its left end on transverse shaft 31' by links 32' 32', upper suspension boxes 33' 33' and pins 34' 34'. For additional rigidity, reinforcing arms 35 35 may be provided at the right end of sash frame 24. The lower ends of these arms 35 35 may be fast to links 32 32, and their upper ends may be oscillatably carried in suspension boxes 39 39 on shaft 31. The left end of sash frame 24 may be provided with similar arms. Suspension boxes 33 33 and 39 39 may be prevented from lateral movement on shaft 31 in any convenient manner, such as by means of collars 40 40 arranged on each side of each of the said suspension boxes. The suspension boxes 33' 33' on the left end of the sash frame may be similarly located against lateral movement.

Stones to be cut vary in height. It becomes, therefore, necessary at the beginning of a cutting or sawing operation to adjust sash 24 with blades 25 vertically to suit. For this purpose, shaft 31 at the right-hand end of sash 24 may be attached to the uprights 21 21 by means of guide saddles 41 41, as shown most clearly in Fig. 1. Each guide saddle 41 is slidably attached to its respective upright 21 by means of a vertical guide plate 42 and is in threaded engagement with a feed screw 43, rotatably held in suitable bearings 44 and 45 near its upper and lower end, respectively. Sash 24 is suspended at its left end on uprights 21' 21' in a manner identical to that described in connection with its right-hand end. Thus, by rotating the four feed screws 43 43 and 43' 43', the sash 24 may be raised or lowered. To facilitate this vertical adjustment of sash 24, feed screws 43 43 may carry at their upper ends bevel gears 49A 49A, which are in mesh with bevel gears 49 49 on cross-shaft 48, suitably journalled in bearings 50 50. Shaft 48 is operatively connected with a power source, such as an electric motor 46, mounted on bracket 47, fast to the right-hand upright 21 (Fig. 1). The drive of the feed screws on the left-hand end of the machine is identical, except that motor 46 is usually employed for actuating all said feed screws simultaneously. To accomplish this, left-hand drive shaft 48' may be connected to power shaft 48 by means of intermediate shaft 51, which carries at its right-hand end bevel gear 52, in mesh with bevel gear 53, fast to shaft 48. A similar set of bevel gears may operatively connect shaft 51 at its left-hand end with shaft 48'.

Feed screws 43 43 43' 43' may also be employed for automatically feeding the cutting blades 25 into the stone block 54 during the cutting operation, for which purpose a ratchet feed is usually employed (not shown).

Figs. 8, 9, and 10 show a conventional method of attaching the cutting blades 25 to sash 24. The left ends 55 of blades 25 may be held in sash 24 by holders 56, inserted between the spaced-apart channel sections 27' and 28'. The heads 57 of holders 56 rest against the channels 27' and 28' and have their fork-shaped ends pin-connected with the saw blades 25. To attain proper cutting action, blades 25 must be under considerable tension. For the purpose of subjecting blades 25 to the required tension, the right end 58 of each blade 25 is similarly anchored to channels 27 and 28 of sash 24 by a holder 59, whose one fork-shaped end is pin-connected with saw blade 25 and whose other end is slotted to receive a wedge 60 for tensioning the saw blades in sash 24, as shown in Fig. 8. The number of saw blades 25 mounted in sash 24 depends upon the thickness of the various slabs to be cut from the stone block 54. As an illustration, eight cutting blades are shown in Fig. 1, but any desired number of such blades may be mounted side by side.

The gang saw previously described is old and well known in the art. It does not per se form part of the present invention.

*Hopper feed mechanism*

A novel hopper feed mechanism 61, adjustable in height and located above the stone block 54, is provided for feeding the shot to the cutting blades 25. The shot may be transported to the hopper 61 in any convenient manner, such as, for instance, by means of a suitable conveyor 62, adapted to transport the shot from a container 63 to an inclined chute 64, from which the shot slides by gravity into the hopped trough 65 (Fig. 4).

As previously described, some of the shot is ejected in front and rear of the saw blades 25 during the cutting operation. This shot is used over again, and to collect the same, shallow transverse pits 66 and 66' may be provided at each end of the machine to receive the spilled shot. The operator may transfer the shot accumulated in pits 66 and 66' from time to time to the container 63, which may be heated by electric coils 67, as shown in Fig. 4, or by any other suitable means, such as steam jackets, gas, infra-red rays, etc., for the purpose of drying the shot to prevent it from caking. The reservoir or container 63 may preferably be adapted to drain off any water which may have been brought to the container 63 when transferring the shot from pits 66 or 66'. Any convenient means may be employed for this purpose, such as, for example, a multiplicity of perforations 68, as shown in Fig. 4. The dried shot is picked up by the conveyor 62 and delivered to the hopper trough 65, as previously described. Chute 64 and trough 65 may also be heated by electric coils 69 and 70, respectively (Figs. 4 and 11), or by any other suitable means, to keep the shot dry until fed to the cutting blades 25.

Hoisting apparatus for hopper feed

To carry the hopper feed 61 and to position the latter in height for accommodating stones of different heights, an auxiliary structure may be provided, consisting of two uprights 71 and 72 in front of the machine and similar uprights 73 and 74 in back of the machine. Two cross-members 75 and 76 may connect uprights 71 with 73 and 72 with 74, respectively, to form a rigid frame.

Figure 12:
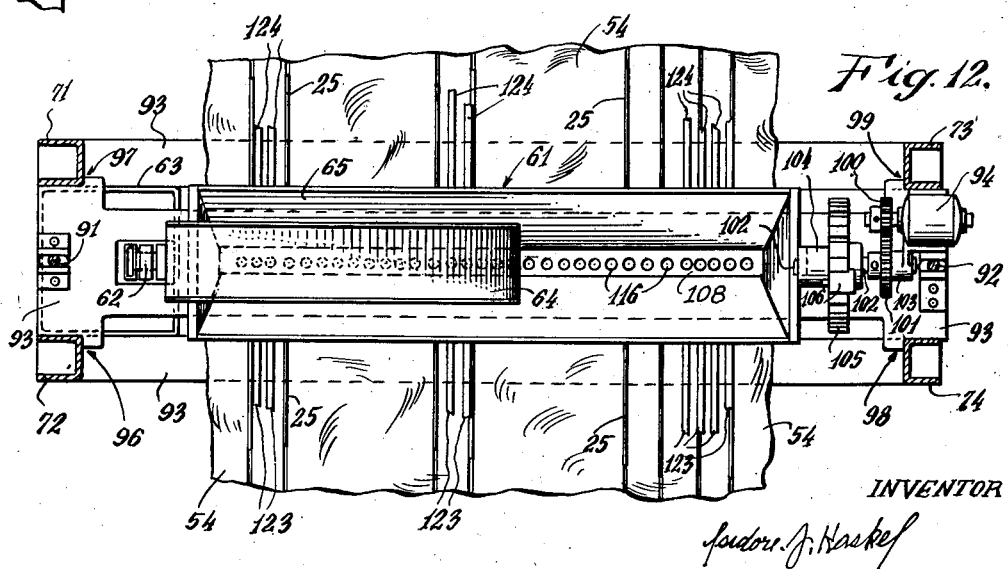
Fig. 12 is a section taken along lines 12—12 of Fig. 1 and illustrates primarily a plan view of the hopper.

A platform 77 is shown in Fig. 3 to extend across members 75 and 76, carrying suitable driving means, such as an electric motor 78, whose output shaft may be provided with bevel gear 79, in mesh with bevel gear 80 on transverse shaft 81, which is journalled in bearings 82, 83, and 84. Worms 85 and 86 are fast to the front and rear ends of shaft 81, respectively, and are in mesh with respective worm wheels 87 and 88. Worm wheels 87 and 88 are mounted in brackets 89 and 90, which are adapted to hold said worm wheels 87 and 88 against vertical movement but permit their rotation. Lifting screws 91 and 92, pin-connected to a transverse base 93 which carries the hopper feed 61, are in threaded engagement with rotatable worm wheels 87 and 88, respectively. Base or platform 93 is guided by shoulders 96 and 97 on uprights 72 and 71, respectively, and by means of shoulders 98 and 99 on uprights 74 and 73, respectively (Fig. 12). Consequently, base 93, on which hopper mechanism 61 is mounted, may be lifted when electric motor 78 is caused to rotate in one direction or lowered when said motor is reversed.

Hopper feed proper

Figs. 4, 5, 6, 11, and 12 depict the novel hopper feed in greater detail. The trough 65 is suitably fastened to the vertically adjustable base or platform 93, previously described. Any suitable power source, such as an electric motor 94, may be mounted on a pedestal 95, fast to platform 93. Pinion 100 on output shaft of motor 94 meshes with gear 101, fast to intermediate shaft 102, which is journalled in brackets 103 and 104. Shaft 102 also carries gear rim 105, adapted to receive a variable number of removable teeth 106, for which purpose rim 105 is provided around its periphery with a plurality of recesses 113 and bores 114 into which teeth 106 and their studs 112 fit. Teeth 106 may be securely but removably held in place by means of cotter pins 115, as shown in Fig. 4. When shaft 102 is rotated, gear teeth 106 will contact a star 107 and thereby rotate distributing shaft 108, to which star 107 is fast. With two teeth 106 mounted on rim 105, as shown in Fig. 5, shaft 108 will make one-half of one revolution for each complete revolution of shaft 102. It will be seen that the speed of rotation of shaft 108 may be changed to meet different requirements by inserting a desired number of teeth 106 in rim 105. Thus, when the maximum number of twelve teeth 106 are inserted in rim 105, for example, shaft 108 will make three revolutions for each revolution of shaft 102.

Shaft 108 is rotatably mounted in bearings 109 and 110 of hopper trough 65. To facilitate maintenance and to reduce friction and abrasion, trough 65 may be lined with a sleeve 111 acting as a wiping lip. The latter may be made of any suitable material, such as fiber, and may partly surround shaft 108. Wiping lip 111 is open at the top to allow the shot in trough 65 to come in direct contact with shaft 108. The clearance between sleeve 111 and shaft 108 is preferably kept close, to prevent shot from infiltrating.

Distributing shaft 108 is provided on its periphery with rows of pockets 116, which will successively gather shot from trough 65 which shaft 108 is rotating. These pockets 116 may be spaced along shaft 108 in any desired pattern. As an example, Figs. 4 and 11 show a multiplicity of series of pockets 116, of which each series is shown to consist of four pockets in the same transverse plane of shaft 108, with each pocket of a series being located 90° away from its adjoining pocket. For each series of pockets 116, a port 117 is provided, located in the same transverse plane as the series of pockets which it serves. Port 117 extends through sleeve 111 and trough 65 and terminates in three distributing outlets 119, 120, and 121 in a base plate 118 of hopper feed 61. Outlets 119, 120, and 121 have attached thereto flexible hoses 122, 123, and 124, respectively, or any other suitable means for transmitting the shot by gravity to designated points along cutting blades 25. The quantity of shot fed to the blades 25 may be regulated by employing different numbers of teeth 106 in rim 105, thereby varying the speed of shaft 108. The amount of shot fed may be further controlled by closing one or more pockets 116 of one or all series of pockets by means of plugs, such as indicated at 125 (Fig. 11).

A modification of the hopper 61 is shown in Fig. 13, which is substantially identical to the one previously described, with the exception that all the shot from one series of pockets in the same transverse plane of shaft 108 is delivered to one outlet and to one hose 126. When the shot from each series of pockets is distributed to more than one outlet, for instance, to three outlets, as shown in Fig. 11, the possibility exists of a slight deviation in the amount of shot distributed to each one of the outlets 119, 120, and 121. The modification shown in Fig. 13 permits exact and positive control over the amount of shot delivered to each preselected point on cutting blades 25. Thus, more shot may be fed, for instance, to the center of blades 25 than to the points near their right or left-hand ends, or vice versa.

Water feed

It was previously pointed out that the presence of water is desirable during the cutting operation.

For this purpose, a plurality of longitudinal pipes 127, suitably fastened to the lower surface of platform 93, may be employed. These pipes 127 may terminate in a common header 128, to which the water is supplied by any convenient means, such as a hose 129. A series of pet-cocks 130 may be spaced along each of the pipes 127 for regulating exactly the amount of water required for the cutting operation. While considerable quantities of water were required heretofore, for the reasons previously explained, a small fraction thereof will suffice with my novel shot-feeding device.

Operation

When a stone block of a certain size and grade is to be cut into slabs, the operator mounts the required number of saw blades 25 in sash 24, spaced laterally corresponding to the desired thickness of the several slabs, and adjusts sash 24 with blades 25 in height by means of motor 46, to accommodate the particular stone block. He inserts the required number of teeth 106 into rim 105, and, depending on the amount of shot desired at different points along the saw blades 25, he may also render certain pockets 116 or complete series of pockets in distributing shaft 108 inoperative by inserting plugs 125. He then positions the hopper feed 61 at the proper height by means of motor 78, brings the stone block into working position, and places the ends of the shot feed hoses, such as 122, 123, and 124, at the desired points along each saw blade 25; finally, he regulates the flow of water by manipulating pet-cocks 130 of pipes 127 or by controlling the quantity of water supplied to header 128. The operator then starts the gang saw proper to impart a reciprocating or swinging movement to sash 24, which carries blades 25. At the same time, conveyor 62 and motor 94, which actuates the hopper feed 61, will be started to supply shot to the blades. An automatic feed (not shown) lowers sash 24 gradually and feeds the blades 25 into the stone block until the block is parted into the several slabs. Figs. 1 and 2 show the position of the blades 25 relative to the stone block at the start of the cutting or sawing operation, when the ends of the shot-feeding hoses 122, 123, and 124 will spill the shot against the sides of blades 25. After the saw blades have cut so deep into the stone that their upper edges are inside the stone block, the shot will be deposited by the hoses into the grooves cut by the blades. Because the shot adheres not only to the cutting edges but also to the sides of the blades, the cut grooves are wider than the saw blades. Hence, the shot deposited on top of the blades will work down on both sides of the blades toward the cutting edges.

The operator may, of course, perform the several adjustments of the gang saw preparatory to the actual cutting operation in any sequence which may prove most convenient to him.

In the preferred embodiment of my invention, a hoisting apparatus for the hopper feed 61 is shown, but such simple means as a pulley block, for instance, may be employed instead, if desired; or the hopper feed 61 may be fixedly mounted at a sufficient height above the sash 24, so as to permit cutting or parting of stone blocks of any height within the limits of the gang saw design proper. Then, feeding hoses (such as 122, 123, and 124) of sufficient length would advantageously be employed to reach the designated feeding points along the saw blades.

For illustrative purposes, three shot-feeding points along the cutting blades have been shown in Fig. 2, but any desired number of feeding points along each blade may be similarly supplied with predetermined quantities of shot.

Chute 64 is depicted as feeding the shot substantially to the center of hopper trough 65, because shaft 108 has a tendency to distribute the shot over the whole length of the trough 65. However, if desirable, the chute 64 may be designed to deposit the shot at several points or uniformly along the trough 65. This may be accomplished in various ways; as, for instance, by extending chute 64 to cover the whole length of trough 65 and by providing perforations in the bottom of chute 64.

When a stone block has to be cut into a great number of thin slabs, one hopper feed may not be sufficient to provide a sufficient number of shot-feeding outlets, in which case two or more similar hopper feeds may be employed. Thus, my invention makes it possible to supply shot to any required number of cutting blades with perfect timing and control.

Instead of varying the rate of rotation of shaft 108 by attaching a greater or lesser number of teeth 106 to rim 105, any commercially available variable speed control device may be employed instead.

While I have shown and described, by way of example, mechanisms for obtaining the stated objects, I wish to have it understood that various changes or modifications may be made within the scope of the claims hereto attached without departing from the spirit of the invention.

What I claim is:

1. In a gang saw for parting stone blocks and the like into slabs, a multiplicity of saw blades, a sash for mounting said blades in spaced-apart relationship, a structure for suspending said sash, means for imparting a to-and-fro movement to said sash relative to said structure, a hopper mounted above the stone block to be cut, means for adjusting said hopper vertically to accommodate stone blocks of varying heights, a receptacle containing shot, perforations in said receptacle; conveying means for transporting the shot from said receptacle to said hopper, said receptacle, conveying means, and hopper having heating means associated therewith for drying the shot; said hopper comprising a revolvable shaft having a multiplicity of series of pockets along its periphery adapted to be filled with shot from said hopper when said shaft is rotated, means for rendering some of said pockets inoperative, a wiping lip partly surrounding said shaft, variable speed control means for rotating said shaft at selective speeds, a port communicating with each of said series of pockets, a plurality of outlets associated with each port, adjustable means for carrying the shot from each one of said outlets to any designated point along one of said saw blades to distribute the shot delivered by one of said series of pockets to a plurality of designated points along said saw blades, and adjustable means for supplying water to said saw blades.

2. In a gang saw for parting stone blocks and the like, a multiplicity of saw blades, a sash for mounting said blades in spaced-apart relationship, a structure for suspending said sash, means for actuating said sash relative to said structure, a hopper mounted above the stone block, means for adjusting said hopper vertically to accommodate stone blocks of varying heights, a receptacle containing shot, conveying means for transporting the shot from said receptacle to said hopper; said receptacle, conveying means, and hopper having heating means associated therewith for drying the shot; said hopper including a revolvable shaft having a multiplicity of series of pockets along its periphery adapted to be filled with shot from said hopper when said shaft is rotated, variable speed control means for rotating said shaft at selective speeds, a port communicating with each of said series of pockets, means for carrying the shot by gravity from each of said ports to designated points along said saw blades.

3. In a gang saw for parting stone blocks and the like, a multiplicity of saw blades, a sash for mounting said blades in spaced-apart relationship, a structure for suspending said sash, means for actuating said sash relative to said structure, a hopper mounted above the stone block, means for supplying said hopper with shot; heating means associated with said hopper to dry the shot; said hopper comprising a revolvable shaft having a multiplicity of series of pockets along its periphery adapted to be filled with shot from said hopper when said shaft is rotated, means for rotating said shaft at selective speeds, a port communicating with each of said series of pockets, means adapted to carry the dried shot by gravity from each of said ports to predetermined points along said saw blades, and adjustable means for supplying water to said saw blades.

4. In a gang saw for parting stone blocks and the like, a multiplicity of saw blades, a sash for mounting said blades in spaced-apart relationship, a structure for suspending said sash, means for actuating said sash relative to said structure, a hopper containing shot mounted above the stone block; heating means associated with said hopper to dry the shot; said hopper comprising a revolvable shaft having a multiplicity of series of pockets along its periphery adapted to be filled with shot from said hopper when said shaft is rotated, means for rotating said shaft at selective speeds, a port communicating with each of said series of pockets, and adjustable means for conveying the dried shot by gravity from each of said ports to designated points along said saw blades.

5. In a gang saw for parting stone blocks and the like by means of reciprocating cutting blades, a hopper mounted above the stone block, means for supplying shot to said hopper, heating means associated with said hopper to dry the shot; a revolvable shaft associated with said hopper, said shaft having a multiplicity of pockets along its periphery adapted to gather shot from said hopper, means for rotating said shaft, and further means for conveying the shot from said pockets to predetermined points along said saw blades.

6. In a gang saw for cutting stone blocks into slabs by means of reciprocating cutting blades, a shot-feeding device mounted above the stone block to be cut and having heating means associated therewith for drying the shot, means for supplying shot to said feeding device, a revolvable shaft having a multiplicity of pockets along its periphery forming part of said feeding device, means for rendering inoperative preselected pockets of said shaft, means for rotating said shaft to fill the remaining pockets with shot, and further means for conveying the shot from said remaining pockets to predetermined points along the saw blades.

7. In a gang saw for parting stone blocks and the like, in combination, a plurality of cutting blades, means for reciprocating said blades, a shot-feeding device mounted above the stone block to be parted and having heating means associated therewith for keeping the shot dry, means for supplying shot to said feeding device, a revolvable shaft associated with said feeding device, said shaft having a multiplicity of pockets along its periphery, means for rendering preselected pockets of said shaft inoperative, means for rotating said shaft to fill the remaining pockets with shot, adjustable means for conveying the shot from said remaining pockets by gravity to designated points along the cutting blades, and further adjustable means for feeding a predetermined amount of water to said cutting blades.

8. In a machine for parting stone blocks and the like, cutting blades, means for actuating said cutting blades, a shot-feeding device for supplying shot to said cutting blades at preselected points therealong, said shot-feeding device being adapted to supply predetermined volumes of shot to each of said preselected points and having heating means associated therewith for drying the shot, and further adjustable means for supplying a predetermined quantity of water to said cutting blades.

9. In a machine for cutting stone blocks and the like, cutting blades, means for actuating said cutting blades, a device for feeding a predetermined volume of shot to each of said cutting blades at preselected points therealong, said feeding device having heating means associated therewith for drying the shot, and further means for supplying water to said cutting blades.

10. In a machine for cutting stone blocks and the like, cutting blades, means for actuating said cutting blades, a shot feeding mechanism for supplying predetermined volumes of substantially dry shot to said cutting blades at preselected points therealong including independently adjustable means for regulating the rate of shot delivery, conveying means including heating means for supplying dried shot to said feeding mechanism, and adjustable means for supplying a predetermined quantity of water to said cutting blades separately from the aforementioned shot delivery.

11. In a machine for parting stone blocks and the like, cutting blades, means for actuating said cutting blades, a shot feeding device for supplying shot to said cutting blades at preselected points therealong, said shot feeding device being adapted to supply predetermined volumes of shot to each of said preselected points, conveying means for transporting shot to said feeding device, said feeding device and said conveyor having heating means associated therewith for drying the shot, and further independent and adjustable means for supplying a predetermined quantity of water to said cutting blades.

ISIDORE J. HASKEL.

REFERENCES CITED

The following references are of record in the file of this patent:

UNITED STATES PATENTS

| Number | Name | Date |
|---|---|---|
| 366,023 | Peckover | July 5, 1887 |
| 1,890,109 | Cox et al. | Dec. 6, 1932 |
| 1,921,697 | Owens et al. | Aug. 8, 1933 |
| 2,189,780 | D'Avancourt | Feb. 13, 1940 |

FOREIGN PATENTS

| Number | Country | Date |
|---|---|---|
| 45,440 | Switzerland | Oct. 13, 1908 |